United States Patent [19]

Chen et al.

[11] Patent Number: 6,026,676

[45] Date of Patent: Feb. 22, 2000

[54] METHOD OF DETERMINING A GLIDE AVALANCHE BREAK POINT OF A MAGNETIC RECORDING MEDIUM

[75] Inventors: Hung-Wei Chen, Yi Lan Hsien; Teng-Chien Yu, Hsinchu; Ming-Hung Su, Taipei; Yi-An Chen, Taoyuan; Philip Yong, Chung Li, all of Taiwan

[73] Assignee: Trace Storage Technology Corp., Hsinchu, Taiwan

[21] Appl. No.: 08/887,144

[22] Filed: Jul. 2, 1997

[51] Int. Cl.7 .................................................. G01B 17/08
[52] U.S. Cl. ............................................................ 73/105
[58] Field of Search ................................................ 73/105

[56] References Cited

U.S. PATENT DOCUMENTS 5,488,857  2/1996  Homma et al. ............................ 73/105
5,689,064  11/1997  Kennedy et al. ......................... 73/105

*Primary Examiner*—Robert Raevis
*Attorney, Agent, or Firm*—Harness, Dickey & Pierce, P.L.C.

[57] ABSTRACT

A glide head with mounted PZT sensor is used to obtain a glide avalanche curve. The glide head is subsequently gradually decreased until the signal is extremely high. First, at least one resonance frequency of the glide head is determined. The frequency component of the PZT glide signal to each specific irregular peak is analyzed by using the speed of the glide head divided by the bump spacing, multiplied by a factor, m, where m is an integer number. The next step of the present invention is to determine a glide avalanche break point of the recording medium. Then, the glide avalanche point is determined in the region which is between the irregular peaks and the extremely high signal.

13 Claims, 4 Drawing Sheets

METHOD OF DETERMINING A GLIDE AVALANCHE BREAK POINT OF A MAGNETIC RECORDING MEDIUM

FIELD OF THE INVENTION

The present invention relates to a method of determining the glide height of a magnetic recording medium and, more specifically, to a method of determining the glide avalanche point of a magnetic medium having a well-defined periodic and discrete texture.

BACKGROUND OF THE INVENTION

Presently, great progress has been made in the field of magnetic recording media. A magnetic disc is widely used as magnetic recording media to store data in magnetizable form. Typically, the data stored on the magnetic disc or record data on the disc is read by a read-write head of the magnetic recording media. The read-write head is moved relative to the disc and selectively positioned at close proximity to the surface of the data storage region to perform "read" or "record" data operation. Namely, the read-write head is selectively positioned radially across the data storage region to either record or retrieve data that is located on the particular position on the disc. As is well known in the art, the distance between the bottom surface of the read-write head and the surface of the disc is referred to as the "flying height" of the read-write head. The closer the read-write head, the more data that can be stored on the disc. When the disc rotates near its operating speed, the read-write head is supported in parallel, spaced apart relation to the disc's surface by an "air bearing" that is formed by air flowing between the read-write head and the upper surface in the direction of disc rotation as the disc rotates. After the reading or recording operation and during deceleration of the disc, the arm of the read-write head is moved inward to position the glide head directly on the landing zone of the disc. Thus, the read-write head contacts the landing zone when the disc driver is stationary. Prior to the next reading or recording operation, the disc is accelerated from stationary on the disc by the disc driver. The arm is not actuated to remove the read-write head from the landing zone until the read-write head is supported by the "air bearing".

The demand for high recording density of the disc requires a continuous decrease in the head/disc spacing. It is well known that the disc surface topography has to be controlled for a low roughness so that the glide heads can fly safely at such low glide height without sacrificing the head/disc stiction. A smooth, specular recording surface is thus used, which permits closer proximity of the read-write head to the disc surface. However, if the surface of the disc is too flat, the precision match of the surface gives rise to excessive stiction and friction during the start-up and stopping of the disc. Therefore, the surface of the landing zone formed on the disc is intentionally roughened to induce the head/disc stiction. The increased surface roughness of the contact area is achieved by controlled texturing of the disc. Therefore, the landing zone is textured to a very tight range and well-defined topography.

FIG. 1 illustrates a typical data recording medium, i.e. a magnetic disc 2 and a glide head 4. The glide head 4 is used to detect the flying height of the disc 2. At the center of the magnetic disc 2 is an opening 10 to accommodate to a vertical spindle of a disc drive for rotating the disc 2. The upper surface of the disc 2 further includes a radially inward section 12 for clamping the disc with respect to the spindle. A landing zone 14 is formed on the surface of the disc 2. When the disc 2 is at rest, the glide head 4 is located in contact with the landing zone 14. Between the landing zone 14 and the outer circumferential edge 16 of the disc 2 is a data storage region 18 to store data.

Typically, one or more discs 2 are rotated on a central axis of a disc driver. Generally, the glide head 4 is radially moved relative to the disc 2 vertical to the arm 6 (the direction of movement is denoted by an arrow) and selectively positioned at close proximity to the surface of the data storage region 18 to detect the flight height. The flight height is controlled as close to the surface of the disc 2 as possible, i.e., to minimize the "flying" height of the glide head 4. When the disc rotates near its operation speed, the glide head 4 is supported by the "air bearing" as the disc 2 rotates. Thus, what is required is a method to determine the glide height of the textured disc.

SUMMARY OF THE INVENTION

In accordance with the present invention, a method of determining a glide avalanche point of a magnetic medium having a well-defined periodic and discrete texture is provided. A glide head with mounted PZT sensor is used to obtain the glide avalanche curve. In an embodiment, the PZT the glide head (glide head) is set over the surface of the magnetic medium. The flying height of said glide head is set at an initial value. The glide head is subsequently gradually decreased until the signal is extremely high. First, at least one resonance frequency of the glide head is determined. In the preferred embodiment, the frequency component of PZT the glide signal to each specific irregular peak is analyzed by using the speed of the glide head divided by the bump spacing, multiplied by a factor, m, where m is an integer number.

The next step of the method of the present invention is to determine a glide avalanche point of the recording medium. The glide avalanche point occurs when the glide head hits the highest peak formed on the surface of the recording medium. The hitting signal should be the highest in the glide avalanche curve. Thus, the glide avalanche point is located in the region which is between the irregular peaks and the extremely high signal.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
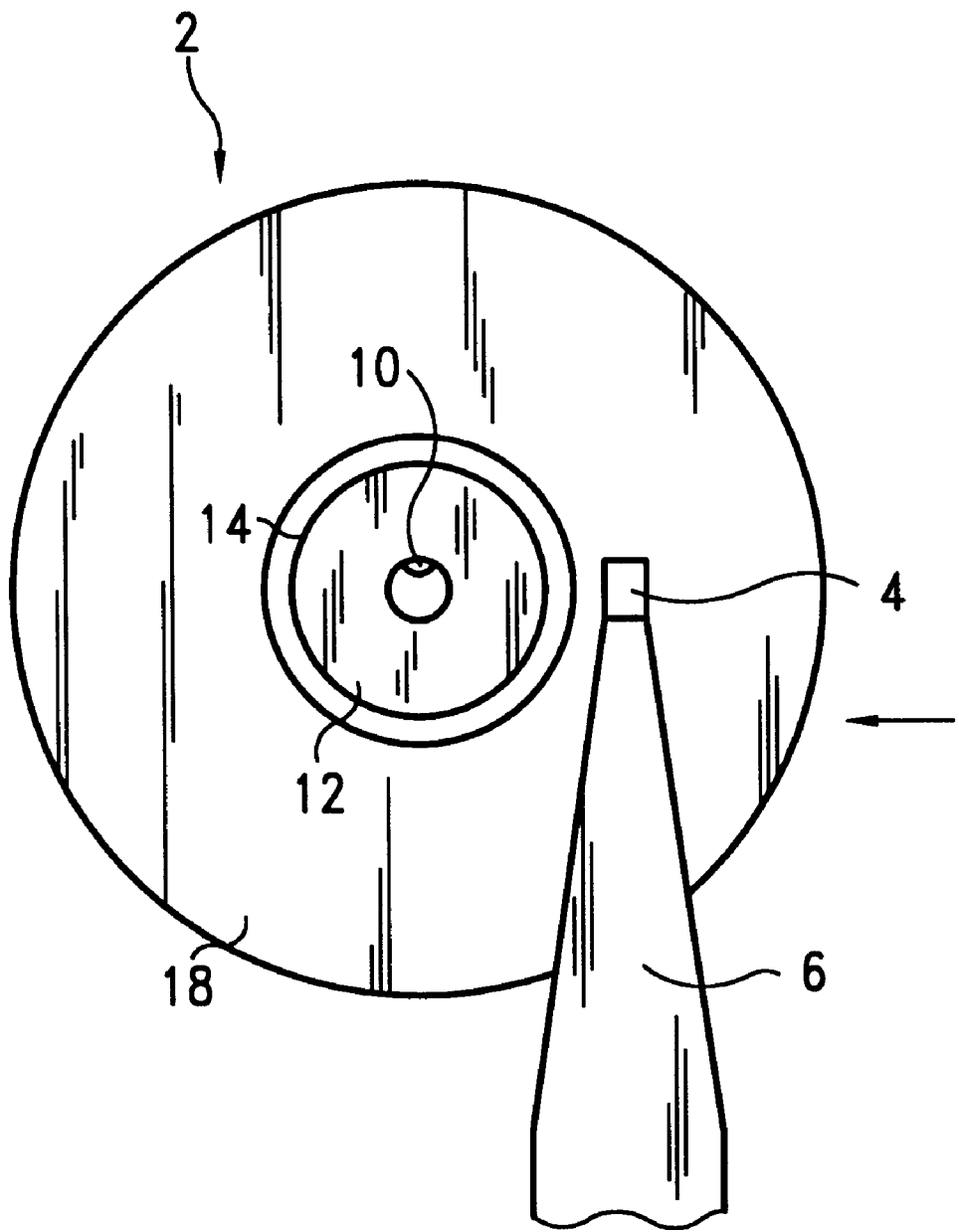
FIG. 1 is a drawing illustrating a magnetic medium and a glide head with the PZT trancerducer in accordance with the prior art.

A new method is disclosed herein to determine the minimum flight height of a defined texture formed on a magnetic recording medium. The magnetic recording medium, such as a magnetic disc, is provided for the present invention. Preferably, the magnetic disc includes an opening to accommodate a vertical spindle of a disc drive for rotating the disc. A radially inward section, a landing zone and a data storage region are formed as is well-known in the art. The formation of the magnetic disc is not the feature of the present invention, thus only a cursory description is provided herein.

The magnetic disc according to the present invention includes uniform texture formed on the entire surface of the landing zone. The surface texture of each area can be formed in accordance with its function. More particularly, the data storage region is polished to a highly smooth texture to permit the desired low flying height for the read-write head. Moreover, the surface of the landing zone is more rough than the one of the data storage zone. Typically, the texture formed on the disc can be generated by using a laser or lithography technique. The texture formed by a laser is referred to as laser zone texture. As is known in the art, a laser induced bump on the disc landing zone has been employed as one of the texturing techniques. Further, the laser zone texture features a well-defined periodic and discrete laser bump and can provide excellent head/disc CSS (contact start stop) performance. Thus, in a preferred embodiment, the texture according to the present invention can be generated by using a laser. For example, a laser is fired at a selected frequency onto the disc while the spindle is rotated. It is appreciated that any suitable method, for example photolithography technology, can also be used to generate the periodic, discrete texture for the present invention.

First, the texture is created on the surface of the recording medium by using a laser. More particularly, the laser zone texturing disc with various bump height and spacings is used in the present invention. In a preferred embodiment, the bumps are induced by a focused, short pulse diode pump laser with a repetition rate of 70 KHz. With the integration of proper optical module, precise linear stage, and air bearing spindle, the laser texturing zone is formed of multiple individual laser induced craters with a condensed, spiral pattern covering the landing zone.

Typically, the laser bump is a simple doughnut shape with a center depression surrounded by a substantially circuit raised rim. The raised bump rim height can be obtained by controlling the laser parameters, such as power, pulse width and spot size. In addition, the bump spacings can be controlled by the spindle rps (revolution per second) and linear stage speed, respectively. The spacings can be categorized as two types according to the direction either along the radius or the circumference on the disc surface. More particularly, the radial spacing is referred to the distance between two adjacent bumps along the circumferential track. For example, the bump spacings according to the present invention are respectively 33 µm and 37 µm. In order to measure the zone position, an optical microscope with a precise X-Y stage is used wherein the bump spacings are obtained by a special design of software from a non-contact optical surface profile. Further, the detailed information relating to the bump, i.e., bump parameters, such as rim height, rim diameter and bump curvature, etc., are measured by a scanning probe microscope. For example, an atomic force microscope (AFM) can be used for the measurement.

Figure 2:
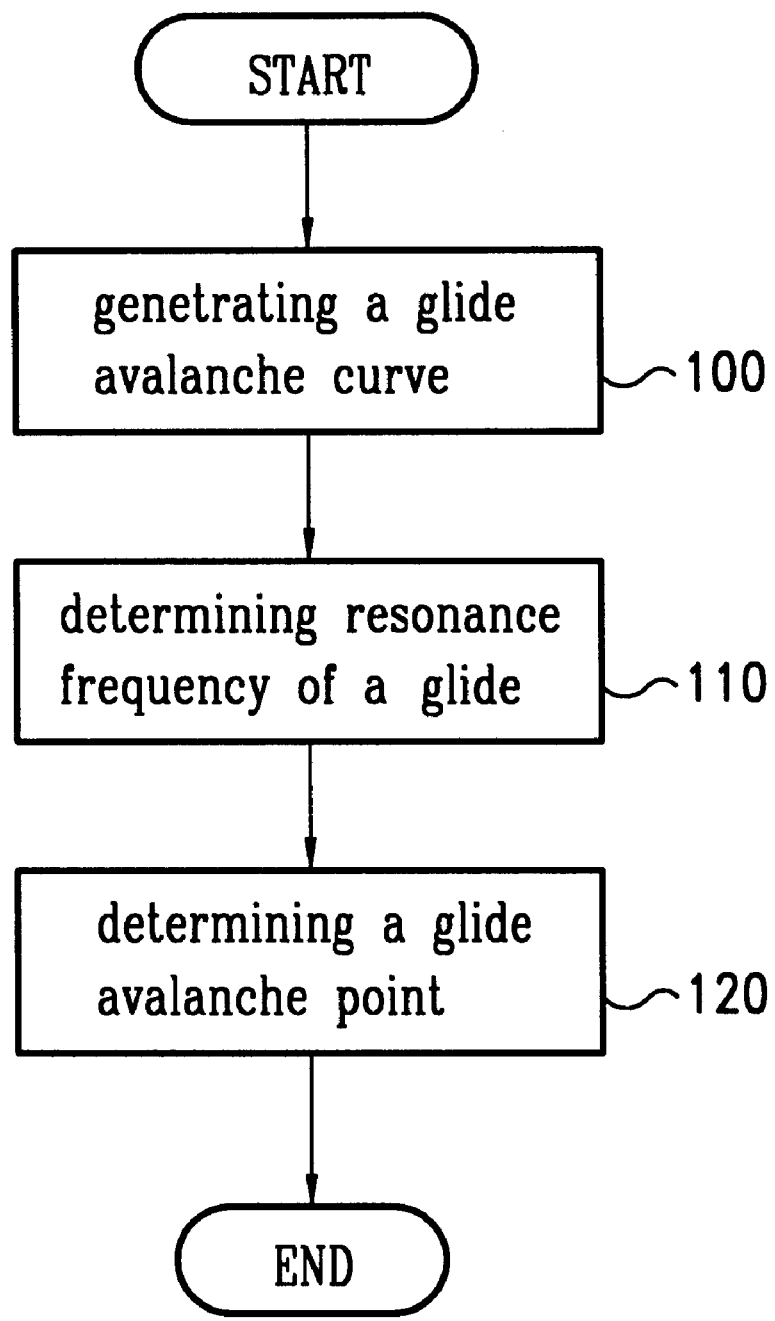
FIG. 2 is a flow chart of a method to determine a glide height of a texture formed on a magnetic recording medium in accordance with the present invention.

Turning to FIG. 2, a flow chart of a method to determine the glide height of the texture formed on the magnetic recording medium is illustrated. In step 100, a glide head with mounted PZT sensor is used to obtain the glide avalanche curve, which can determine the glide height of the magnetic recording medium. As is known in the art, the PZT is one of the piezoelectric materials. Boundary charges will accumulate in the piezoelectric material when the piezoelectric material is under a stress. The flying height of the glide head versus speed curve is calibrated by three discrete wavelength optical interferometry. In this case, the PZT glide head (glide head) is loaded on the laser texturing zone at 21.08 mm from the disc center. Then, the flying height is set at an initial value, for example, 38.1 µm. The glide head is subsequently gradually decreased until the signal is extremely high, which is related to a glide avalanche point. This will be described in detail later. Thus, the glide avalanche curve is achieved.

Figure 3:
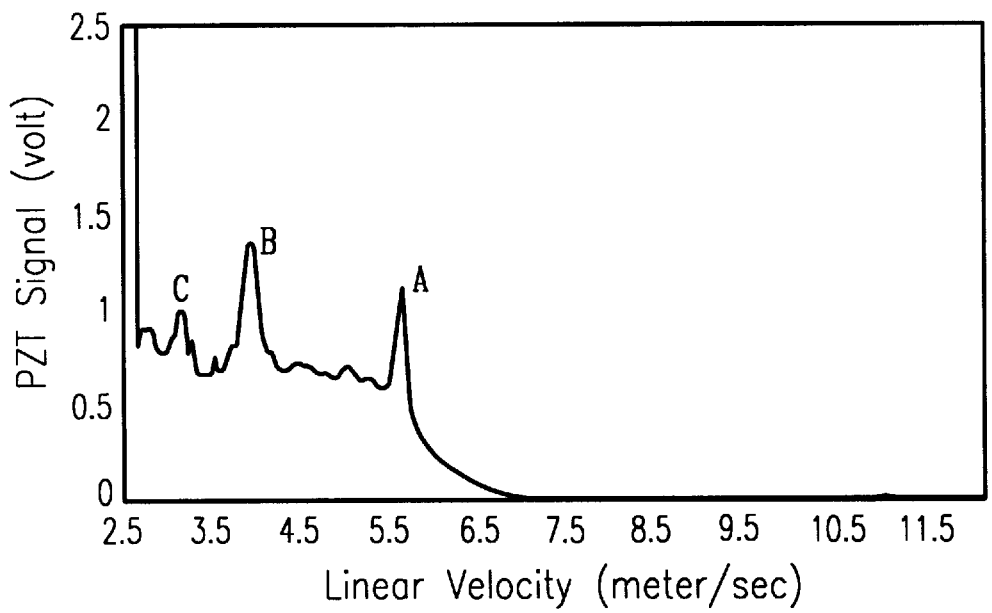
FIG. 3 shows the PZT signal vs. linear speed for a 33 μm bump spacing magnetic medium in accordance with the present invention.
Figure 4:
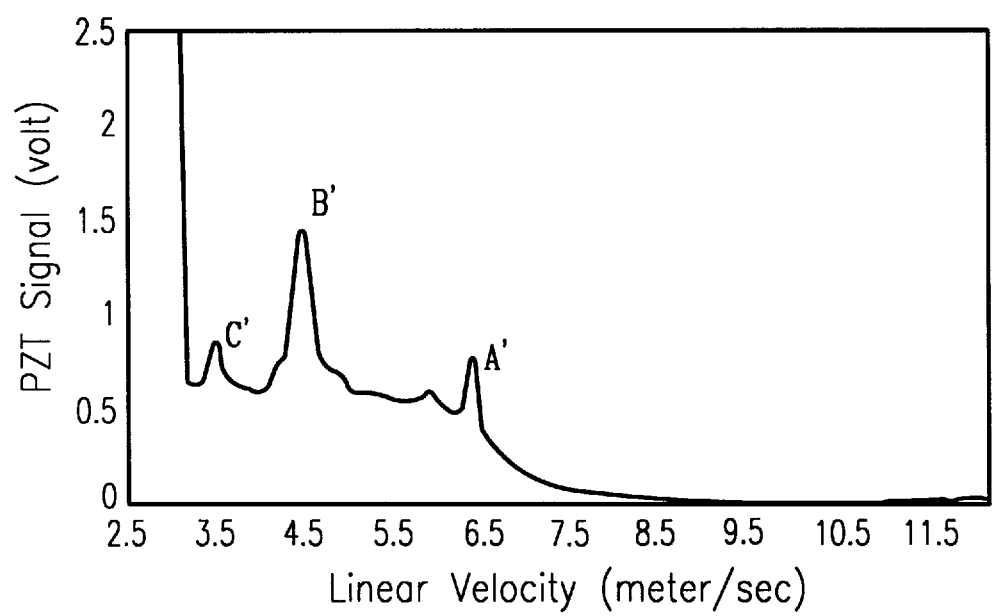
FIG. 4 shows the PZT signal vs. linear speed for a 37 μm bump spacing magnetic medium in accordance with the present invention.

However, at least one of the bump excited frequencies (resonance frequency) of the glide head have to be determined (step 110). The signal voltage versus head flying height with irregular peaks are shown in FIGS. 3 and 4 corresponding to the aforementioned bump spacings. Namely, FIG. 3 shows a curve according to the bump spacing that is 33 µm, whereas FIG. 4 shows a curve according to the bump spacing that is 37 µm. It can be expounded according to the PZT signal against the linear velocity curve. The irregular peaks are caused by the resonance vibration of the glide head. The frequency of the resonance vibration can be determined by either the three discrete wavelength optical interferometry or the following method.

In a first embodiment, these frequencies of the resonance vibration can be measured using the three discrete wavelength optical interferometry by gradually decreasing the flying height of the glide head. In the other words, the first frequency of the resonance vibration is measured until the first irregular peak occurs by decreasing the flying height from the initial position. Then, the flight height of the glide head is gradually decreased until the second irregular peak occurs, then the frequency of the second irregular peak is measured. By repeating the above steps, all of the frequencies of the resonance vibration can be measured.

Figure 5A:
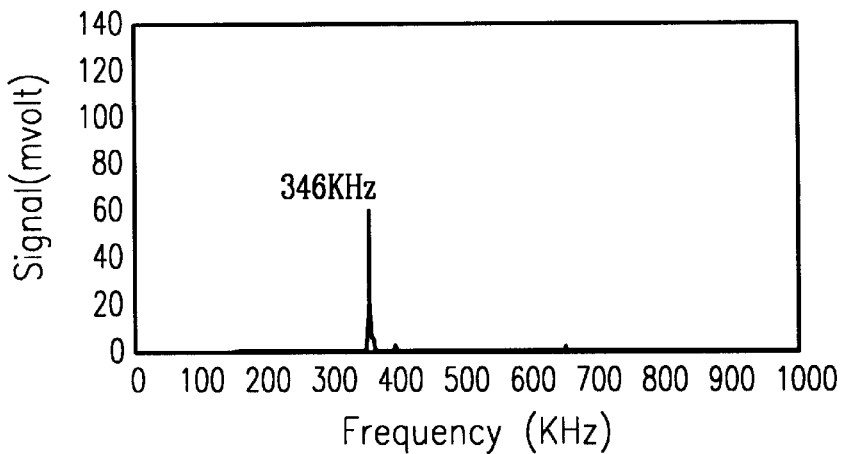
FIG. 5A shows the frequency domain of the PZT signal at irregular peaks for A, A' in FIGS. 3 and 4 in accordance with the present invention.
Figure 5B:
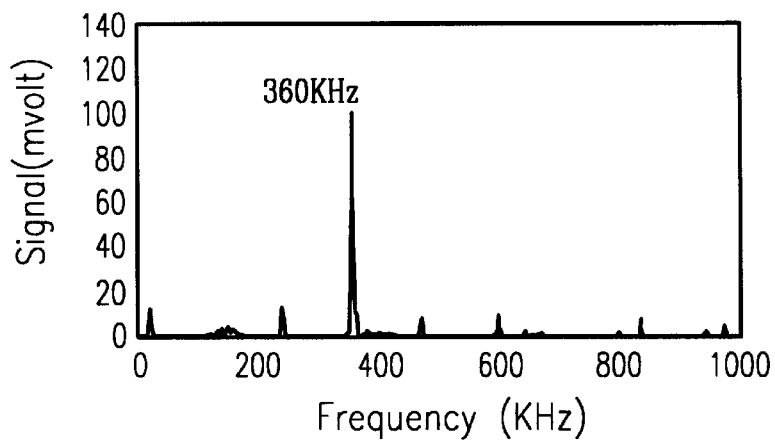
FIG. 5B shows the frequency domain of the PZT signal at irregular peaks for B, B' in FIGS. 3 and 4 in accordance with the present invention.
Figure 5C:
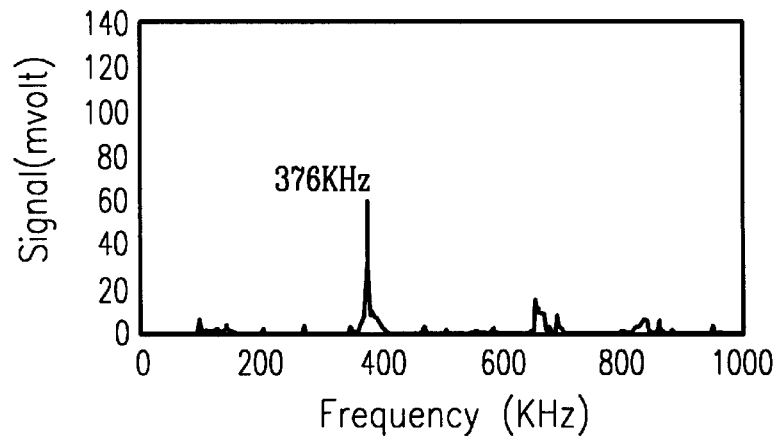
FIG. 5C shows the frequency domain of the PZT signal at irregular peaks for C, C' in FIGS. 3 and 4 in accordance with the present invention.

Another method to determine the resonance vibration is described as follows. In a second embodiment, the frequency component of the PZT glide signal to each specific irregular peak (A, B, C in FIG. 3 and A', B', C' in FIG. 4) are analyzed and shown in FIGS. 5A, 5B, and 5C. They can be calculated by using the speed divided by the bump spacing, multiplied by a factor, m. The formula will be described as follows:

$$F(KHz) = S(m/sec) * 10^3 * m/B(\mu m)$$

where F is the bump excited frequency, S is the linear speed of the glide head, B is the bump spacing, and m is an integer number 2,3,4 . . . and so on. The physical meaning of m is strongly related to the pattern geometry of the laser bumps. In FIG. 3, the signal does not increase significantly until the linear velocity is lower than 7.5 meter/sec, which corresponds to the flying height of 1.8 micro-inches for the speed of 2.88 meter/sec, which is located just below the irregular peak "C". Referring to TABLE 1, the calculated frequency (A1) of the glide head is very close to the measured frequency (A2) with a discrepancy of less than 1%.

TABLE 1

| bump spacing ($\mu$m) | speed (m/sec) | factor | A1 (KHz) | A2 (KHz) |
|---|---|---|---|---|
| 33 | 5.638 | 2 | 342 | 346 |
|    | 3.962 | 3 | 360 | 360 |
|    | 3.099 | 4 | 375 | 376 |
| 37 | 6.375 | 2 | 345 | 346 |
|    | 4.445 | 3 | 360 | 360 |
|    | 3.479 | 4 | 376 | 376 |

The next step 120 of the present invention is to determine a glide avalanche point of the recording medium. The glide avalanche point is corresponds to the glide height of the glide head. The glide avalanche point occurs when the glide head hits the highest peak formed on the surface of the recording medium. Apparently, the hitting signal (glide avalanche break point) should be the highest in the glide avalanche curve. Thus, the glide avalanche point is located in the region which is between the irregular peaks and the extremely high signal. The glide avalanche point is defined as the glide height that the glide head begins to hit on the disc surface. For more detail, the bump height in accordance with the FIGS. 3 and 4 are respectively 18.5 nm and 20.5 nm. The glide avalanche point is found at the linear velocity of 2.88 meter/sec which corresponds to a flying height of 18.8 nm. Similarly, the glide avalanche point is found at 3.25 meter/sec which in terms of flying height is 21 nm.

As will be understood by a person skilled in the art, the foregoing embodiments illustrate rather than limit the present invention. It is intended that various modifications and similar arrangements are included within the spirit and scope of the appended claims, the scope of which should be accorded the broadest interpretation so as to encompass all such modifications and similar structure. Accordingly, while the preferred embodiment of the invention has been illustrated and described, it will be appreciated that various changes can be made therein without departing from the spirit and scope of the invention.

What is claimed is:

1. A method of determining a glide height of a magnetic medium having a well-defined periodic and discrete texture formed thereon, wherein a glide avalanche break point is referred to the flying height of a glide head that impacts the peak of said texture, said method comprising the steps of:

setting a glide head over a surface of said recording medium to have a flying height over a surface of said magnetic medium;

determining a resonance frequency of said glide head;

generating a glide avalanche curve by gradually decreasing said flying height of said glide head, wherein said glide avalanche curve comprises at least one resonance peak and a relative high avalanche point peak to said at least one resonance peak, wherein said at least one resonance peak is caused by the resonance vibration of said glide head, said at least one resonance peak corresponding to said resonance frequency of said glide head, and wherein said relative high avalanche peak is caused by said glide head impacting the peak of said texture, wherein said glide avalanche curve defines a curve that represents a signal generated by piezoelectric material under a stress against the flying height of said glide head; and determining said glide height of said glide head, wherein said glide height corresponds to said avalanche point peak.

2. The method of claim 1, wherein said resonance frequency of said glide head is determined using a speed of said glide head multiplying a factor m, and dividing by a bump spacing of said texture, said m being an integer number.

3. The method of claim 1, wherein said resonance frequency of said glide head is determined using a three discrete wavelength optical interferometry.

4. The method of claim 1, wherein said glide head has a PZT sensor to generate said glide avalanche curve.

5. The method of claim 1, wherein said texture is formed by using laser.

6. The method of claim 1, wherein said texture is formed by using lithography technology.

7. A method of determining a glide avalanche point of a magnetic medium having a well-defined periodic and discrete texture formed thereon, wherein a glide avalanche break point is referred to the flying height of said glide head that impacts the peaks of said texture, said method comprising the steps of:

setting a glide head over a surface of said recording medium to have a flying height over a surface of said magnetic medium:

determining a resonance frequency of said glide head; and determining said glide avalanche point of said glide head.

8. The method of claim 7, further comprising:

generating a glide avalanche curve by gradually decreasing said flying height of said glide head before determining said resonance frequency of said glide head, wherein said glide avalanche curve defines a curve that represents a signal generated by piezoelectric material under a stress against the flying height of said glide head.

9. The method of claim 8, wherein said glide avalanche curve further comprises at least one first peak corresponding to said resonance frequency of said glide head, a relative high second peak to said first peak corresponding to said glide avalanche point, said resonance frequency of said glide head being determined using a speed of said glide head multiplying a factor m, and dividing by a bump spacing of said texture, said m being an integer number, wherein said at least one resonance peak is caused by the resonance vibration of said glide head, and wherein said glide avalanche break point is referred to the flying height of said glide head that impacts the peaks of said texture.

10. The method of claim 8, wherein said glide avalanche curve further comprises at least one first peak corresponding to said resonance frequency of said glide head, a relative high second peak to said first peak corresponding to said glide avalanche point, said resonance frequency of said glide head being determined using a three discrete wavelength optical interferometry, wherein said at least one resonance peak is caused by the resonance vibration of said glide head, and wherein said glide avalanche break point is referred to the flying height of said glide head that impacts the peaks of said texture.

11. The method of claim 8, wherein said glide head has a PZT sensor to generate said glide avalanche curve.

12. The method of claim 7, wherein said texture is formed by using a laser.

13. The method of claim 7, wherein said texture is formed by using lithography technology.

* * * * *